Feb. 22, 1966   M. B. SUTLIFFE   3,236,363
CHANNELED CONVEYORS AND CONNECTING CLIPS THEREFOR
Filed Oct. 16, 1963   2 Sheets-Sheet 1

INVENTOR.
MILES B. SUTLIFFE
BY
Owen, Wickersham & Erickson
ATTORNEYS

Feb. 22, 1966  M. B. SUTLIFFE  3,236,363
CHANNELED CONVEYORS AND CONNECTING CLIPS THEREFOR
Filed Oct. 16, 1963  2 Sheets-Sheet 2
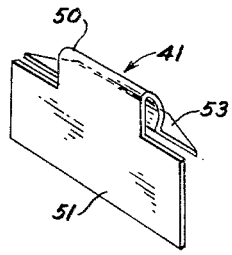
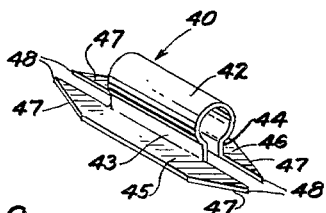
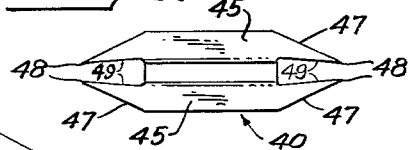
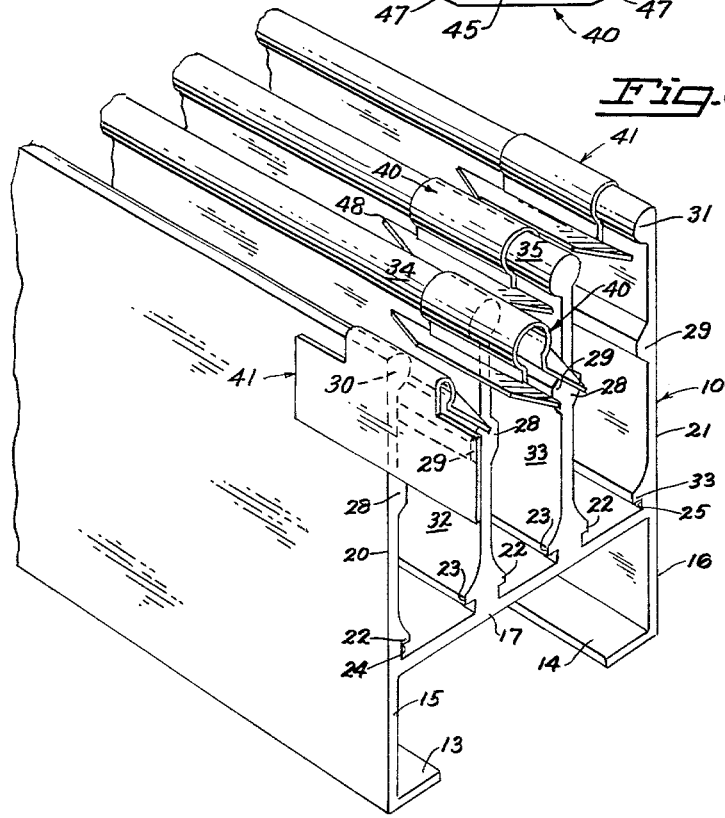
INVENTOR.
MILES B. SUTLIFFE
BY
Owen, Wickersham & Erickson
ATTORNEY

United States Patent Office 3,236,363
Patented Feb. 22, 1966

3,236,363
CHANNELED CONVEYORS AND CONNECTING
CLIPS THEREFOR
Miles B. Sutliffe, Orinda, Calif., assignor to Data-Veyors
Corporation, Oakland, Calif., a corporation of
California
Filed Oct. 16, 1963, Ser. No. 316,555
13 Claims. (Cl. 198—204)

This invention relates to improvements in channeled conveyors and particularly to conveyors in which documents such as records, slips, or letters and the like are fed in channeled courses by bottom-edge engagement with conveyor belting or other motive power.

Many types of such conveyors have been in use heretofore, some of them having been built by assembling individual channel side pieces to individual channel base pieces and others by extruding rigid one-piece channel units in long sections which are connected together. In any event, there have been problems at the connections.

For example, even with the rigid extruded units the connections have typically been made by drilling longitudinally extending holes into ends thereof, inserting dowels into the holes, and then pushing two sections together longitudinally. Such junctures have been most unsatisfactory, but heretofore represented the common practice. With such connection, alignment of the butt ends has been a problem because the dowel holes had to be drilled in very exactly or the two members connected would be somewhat out of line; in instances when the units were made slightly out of line, it was almost impossible to align the dowel openings properly. Moreover, even with good alignment, there still was an exposed seam, where the two edges met; the edges have not always been of identical size and even when they were, these seams caused difficulties. The trouble was that with or without faulty alignment, the ends of the succeeding butt-end sections were exposed and tended to be engaged by the documents flowing within the channel, thereby tending to prevent free flow of the documents, which tended to catch on these edges. If the sections were not pushed together completely tightly, the catching was often very bad, and even if the joints were quite tight, there was still a rough place there that tended to engage the documents and wear it or block it or catch it, so that the conveyor system was not operating up to its full efficiency. With poor channel alignments, the seams tended to cause even more trouble.

Another difficulty with the dowel juncture systems was that the assembly of such systems took considerable time and had to be done most carefully as a hand job, in order to obtain reasonably good alignment and to minimize the difficulties at the seams.

A further difficulty arose no matter how precise the work done: removal of any individual channel section for field repair or modification was quite difficult. For example, suppose that a section in the middle of the system became damaged and needed repair. That section could not be taken out without moving all the sections between that one and one of the ends of the system, for in order to be able to move the adjacent section longitudinally—which was necesary in order to separate it from the dowel—all the succeeding sections had to be moved longitudinally. Thus, considerable time and movement of much of the system was required just to remove or replace any one section of it.

In addition, of course, there were other drawbacks to the juncture systems heretofore in use, such as the amount of time and materials involved in drilling the holes, in inserting the pins, and in making sure that every piece was individually mated to every other piece, for, of course, the dowel holes could not be extruded.

The present invention offers a solution to these problems by providing a system having novel clip means for joining the adjacent sections. As will be shown and as will appear from the following description, these clips assure the proper alignment, stabilize the system, and insure that the documents will flow freely. The documents never come into contact with either a seam, an end of a channel section, or with a butt end of the clip itself. Moreover, the conveyor systems are rapidly assembled when the clips of this invention are used, and any individual section may be removed by a very simple operation, moving only the clips which lock it to its adjacent section and then lifting the individual section out or sliding it out, without having to disturb the rest of the system, including even the sections immediately adjacent to the section to be removed. Accuracy of channel alignment is asured, and there is no need to drill dowel holes.

Other objects and advantages of the invention will appear from the following description of a preferred embodiment thereof.

In the drawings:

FIG. 1 is a fragmentary view in side elevation of a channel system in which a channel section is about to be assembled into a position between two other sections according to the principles of this invention, the clips of this invention being slid out of the way for this operation. To save space, the channel section being inserted is shown as very short, though it will usually be several feet long.

FIG. 2 is a top plan fragmentary view of the assembled system of FIG. 1.

FIG. 3 is a view like FIG. 1 with the section installed.

FIG. 4 is an enlarged view in vertical section taken along the line 4—4 in FIG. 3.

FIG. 5 is an enlarged view in horizontal section, taken along the line 5—5 of FIG. 3.

FIG. 6 is a fragmentary view in perspective of a portion of a document conveyor section.

FIG. 7 is a view in perspective of one of the clips of this invention of the type used on the middle channels.

FIG. 8 is a view in perspective of one of the clips of this invention of the type used on an edge channel.

FIG. 9 is a bottom view of one of the clips of FIG. 7.

Figure 1:
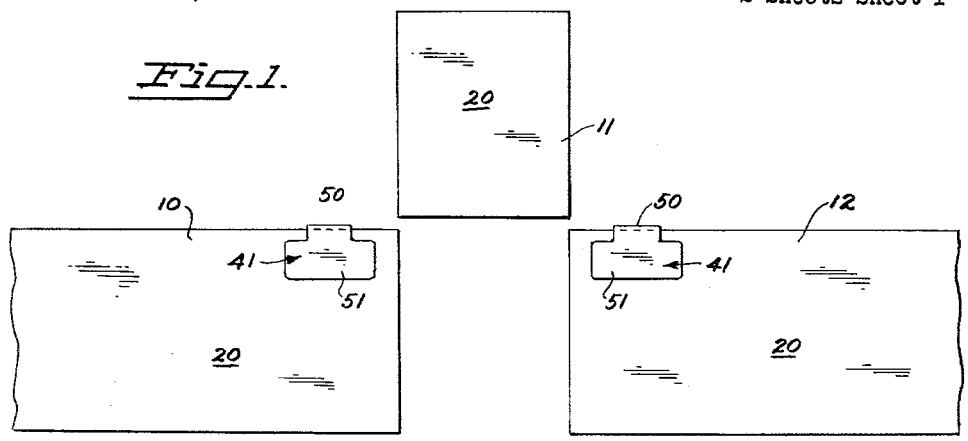
Figure 1:
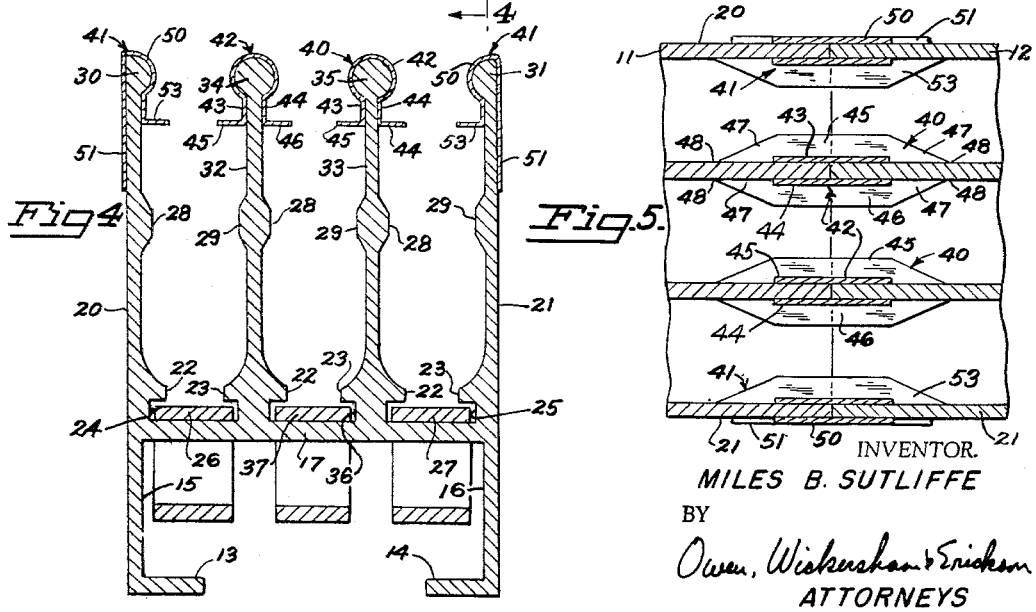

The drawings show parts of a multi-channel document conveyor made up of a series of substantially identical one-piece channel units 10, 11, and 12 (FIG. 1). There may be a number of these extrusions; they may be the same length or different lengths; and they may be shaped typically as shown, or they may have more or fewer channels. In the units 10, 11, and 12, a single extrusion forms a pair of base members 13, 14 which are joined by lower vertical walls 15, 16 to a central web 17, which extends across between the two extreme sides. Above the web 17, two outside walls 20, 21 are provided with projections 22, 23 that are spaced above the web 17 in order to provide a slot 24, 25 between the web 17 and the projection 22, 23 for the passage of a conveyor belt 26, 27 (FIG. 4). The walls 20, 21 then taper up into the normal side wall thickness followed by a generally trapezoidal or similar protrusion 28, 29 about half way up each wall 20, 21, and a bead 30, 31 preferably semicircular in shape, at the top. In between the extreme walls 20, 21 are other walls 32, 33, which are similarly shaped except that they have projections 22, 23 on both sides of them, protrusions 28, 29 on both sides, and a top circular or elliptical bead 34, 35. One or more additional slots 36 are provided, each for an additional conveyor belt 37. The beads 30, 31, 34, 35 and protrusions 28, 29 provide a better path for the passage of the documents by helping to keep the documents away from the recessed length of the wall portion between the beads and the protrusions, and to give better communicaion so that documents flowing in one channel do not interrupt those flowing in another channel. The beads 30, 31, 34, 35 and protrusions 28 and 29 reduce friction between the documents and the side walls, thereby almost completely eliminating static electricity, a common cause of "hang-ups" in conventional channel conveyors.

The present invention provides a series of clips 40, 41 of which there are two types, a double-flanged clip 40 used on the interior beads 34 and 35 and a single-flanged clip 41 used on the beads 30 and 31 of the side walls 20 and 21. These clips 40 and 41 bridge over between the succeeding channel sections 10, 11, and 12, fasten them together in a removable fashion without the use of dowels, and provide a system for diverting the documents away from the wall surfaces at the seams. Thus the documents pass smoothly from one space to another without engagement of edges and butt ends.

Each center clip 40 comprises a tubular central sleeve portion 42 which is snugly slidable on the bead 34, 35. On each side, the sleeve 42 terminates in a downwardly projecting portion 43, 44 that engages the side wall 32, 33 below the bead 34, 35 and leads to diverting flanges 45, 46 that flare out perpendicularly thereto. These diverting flanges 45, 46 extend fore and aft of the sleeve portion 42; they are preferably at their full width for the full length of the sleeve portion 42 and then have portions 47 that taper to sharp points 48 at each end. The interior edges 49 also taper in toward each other at the points 48, diverging away from each other between the points. Thus, the sharp points 48 lie snug against the walls 32, 33, and the documents which pass by them are deflected away from the points by the beads 34, 35 and the protrusions 28, 29; then they are also deflected along the edges 47 to the wider portions 46, then can freely slide back along the edges 47. The flanges 45 are, at their widest portion 46, wider than the beads 34, 35 on the protrusions 28, 29. The rear portions 47 are, of course, less important than the forward portions 47, but they do mean that documents (or clips 40) can be put in in either direction and there will be no interference in either event. The main thing here is that the clips 40 provide a lead-in portion flaring out in the directon the documents are flowing. It will also be noted that the following portion provides for a smooth return of any documents that tend to lean in toward the side. Since the sharp ends 48 lie below the beads 34, 35 and since it is intended that the documents generally project somewhat above the bead, and since there are the central protrusions 28, 29, it is apparent that no documents actually come against the sharp edges 48, for they would have to flex considerably in order to do so; but the sharp edges 48 do provide for even that.

The end clips 41 are similar to the central clips 40 except that instead of having a fully circular sleeve portion 42, they have a semicircular sleeve portion 50 with an exterior clip portion 51 extending down the wall 20 or 21 below a flanged interior portion 53, the portion 51 extending down snugly against the wall 20 or 21. The portion 53 is like the flanged portion 45.

These clips 40 and 41 can be made very tight and snug, and when they bridge the sections 10 and 11, or 11 and 12, they hold the conveyor in perfect alignment from section to section.

In assembly, all the clips 40 and 41 at one junction may be put onto one channel section 10 or 11, or some of them may be on one section and others on another one, so long as they are slid so that their pointed edges 48 are retracted from and do not extend beyond the ends of the conveyor section 10 or 11. Then the conveyor sections 10 and 11 are aligned together carefully and as soon as they are in line, the clips 40 and 41 are slid along to bridge across the junction between sections. As soon as the first clip 40 or 41 is in place, it becomes even easier to align the succeeding ones, and in a matter of seconds all of the clips 40 and 41 are in place, and the sections 10 and 11 are snugly joined together. Any section 10, 11, or 12 is removable, however, by simply sliding all the clips 40 and 41 away from the junction.

It is apparent that no dowel holes have to be drilled, that no dowel pins are to be used, and that alignment of the succeeding sections is achieved, because the clips 40 and 41 take up any slight difference in size or angle. The system is fully stabilized by the clips 40, 41 on every bead 30, 31, 34, 35, and the assembly has been considerably facilitated as compared with the prior art devices. The individual removal of any section (see FIG. 1) has already been spoken of and is quite important since sometimes field modifications or repairs become necessary or at any rate desirable. The channels are accurately aligned and the free flow of the documents within the channels is assured by not having any seams where the butt ends meet and no spaces in between, and due to the flaring structure of the flanges 45, 53 the documents themselves are kept from engaging any place where they could tend to catch and not flow freely, including the ends of the sleeve portions 42, 50 of the clips themselves.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a document conveyor formed from a plurality of sections placed end-to-end, each section having end edges and at least one elongated rigid conveyor channel and a plurality of parallel channel side walls and a transverse wall spanning lower portions of the plurality of side walls, said conveyor having a conveyor belt over said transverse wall of said sections between the side walls, each said side wall having beads at the top ends thereof, means for joining adjacent succeeding sections together for aiding in their alignment, and for diverting documents away from the end edges of said sections, comprising a clip for each succeeding pair of said beads, each clip having a sleeve-like portion engaging its said beads and slidable thereon and having a laterally extending flange lying below said sleeve and said beads and extending into the channels from each interior wall, each said flange being provided with tapered lead-in and document-diverting portions going from a point closely adjacent the wall to a width wider than said bead.

2. In a document conveyor formed from a plurality of sections placed end-to-end, each section having end edges and a plurality of elongated, rigid conveyor channel members each formed with at least three parallel channel side walls and a plate-like web spanning lower portions of said side walls and providing belt underlying surfaces between the side walls, said conveyor having a plurality of belts, one on each said belt underlying surfaces, each said side wall having beads at the top ends thereof wider than the wall portion just below said bead, means for joining the corresponding channel members of succeeding sections together, for aiding in their alignment, and for preventing engagement of said end edges by the documents being conveyed, such engagement tending to cause stoppage of said documents, comprising a clip for each succeeding pair of said beads, each clip having a sleeve-like portion engaging its said bead and slidable thereon and having a laterally extending flange below said sleeve and said beads and extending into the channels from each interior wall, each said flange being provided with tapered lead-in document guiding portions going from an end closely adjacent the wall to a width wider than said bead.

3. The conveyor of claim 2 wherein each said bead comprises generally semicircular portion for and extending into each said channel; the clip sleeve-like portions being shaped to embrace snugly both sides of said bead.

4. The conveyor of claim 3 wherein the extreme side walls have flat outer sides and so do the clips.

5. The conveyor of claim 3 wherein the side walls intermediate the end walls have beads generally circular in cross sections, with the sleeve-like portions of said clips being generally circular in cross section.

6. The conveyor of claim 3 wherein said flange is connected to its sleeve-like portion by a vertical portion that snugly engages its said side wall and is thinner than said bead.

7. The conveyor of claim 2 wherein each said flange extends horizontally and is longer than said sleeve-like portion and has a portion substantially the length of said sleeve-like portion that lies with its edge parallel to said side wall and has therebeyond said tapered lead-in portion, which terminates in a sharp point closely adjacent said side wall.

8. The conveyor of claim 7 wherein each said flange has an inner edge that tapers so as to lie closest to said side wall at each sharp point and to diverge therefrom away from said sharp point.

9. In a conveyor for feeding channeled documents and other material by bottom edge engagement with conveyor belting,
 a series of elongated, rigid, metallic conveyor channel members joined end-to-end at end edges and each formed with a plurality of solid parallel channel side walls and a plate-like web spanning lower portions of the plurality of channel side walls and providing a belt underlying surfaces at the channel bottom between the side walls, with a rib at the lower end of each wall constituting a confluent bridge between the wall and the base and laterally overhanging at each side to provide belt edge guiding recesses on opposite sides of the rib, each wall having beads at the top ends thereof providing generally circular cross sections there, and intermediate protrusions between said ribs and said beads,
 means for joining succeeding said members together for aiding in their alignment and for guiding documents away from engagement with said end edges where they tend to be stopped, comprising a clip for each said bead, each clip having a sleeve-like portion engaging its said bead and slidable thereon and having a laterally extending flange below said sleeve extending into the channels from each interior wall, each said flange provided with tapered lead-in and guiding portions going from a sharp point adjacent the wall to a width wider than said bead.

10. A clip for use in joining together and helping to align succeeding sections of such devices as a document conveyor having a series of successive elongated rigid conveyor channel sections meeting at end edges, each section being formed with a plurality of parallel channel side walls and a transverse wall spanning lower portions of the plurality of side walls, each said side wall having beads at the top ends thereof, each said clip comprising
 a sleeve-like portion for engaging a said bead and slidable thereon and having a laterally extending flange lying below said sleeve for extending into the channels from each interior wall, each said flange being provided with tapered lead-in portions going from a point adapted to lie closely adjacent the wall to a width wider than said bead for diversion of documents away from the end edges where they might otherwise tend to become snagged.

11. The clip of claim 10 wherein each said flange extends horizontally and is longer than said sleeve-like portion and has a portion substantially the length of said sleeve-like portion, adapted to lie with its edge parallel to said side wall, and has therebeyond said tapered lead-in portion, which terminates in a sharp point adapted to lie closely adjacent said side wall.

12. The clip of claim 11 wherein said clip has an inner edge that diverges from a vertical plane in the same direction as said tapered lead-in portion.

13. In a document conveyor formed from a plurality of succeeding sections meeting at end edges, each section having elongated conveyor channel members with at least three parallel channel side walls and a plate-like web spanning lower portions of said side walls and providing belt underlying surfaces between the side walls, said conveyor having a plurality of belts, one on each said belt underlying surface, each said side wall having a bead at its top end wider than the wall portion just below the bead, each said bead providing a generally semicircular projection extending into each said channel, the extreme side walls having flat outer sides while each side wall intermediate the end walls has a bead that is generally circular in cross section,
 means for joining succeeding sections together at the beads, for helping to align said sections, and for diverting conveyed documents from engagement with said end edges, so as to prevent documents from catching on said end edges and stopping there, said means comprising a clip for each succeeding pair of beads,
 each said clip having a sleeve-like portion engaging its said bead and slidable thereon, the clips for the extreme side walls having their sleeve-like portions with one flat outer side and another generally semicircular portion, the clips for the said intermediate side walls having generally circular cylindrical sleeve-like portions,
 each said clip also having a laterally extending flange below said sleeve-like portion and below said beads and extending into the channel there, each said flange being connected to its sleeve-like portion by a vertical portion that snugly engages its said side wall and is thinner than said bead,
 each said flange extending horizontally and being longer than said sleeve-like portion and having a central portion substantially the length of said sleeve-like portion that lies with its edge parallel to said side wall and further out therefrom than its said bead and having therebeyond a document-diverting tapered lead-in portion at each end, going from said central portion to a sharp-pointed end closely adjacent the wall,
 each said flange also having an inner edge that tapers so as to lie closest to said side wall at each sharp point and to diverge therefrom away from said sharp point to aid in snug engagement with said side walls.

References Cited by the Examiner
UNITED STATES PATENTS
3,042,185 7/1962 Welch _____ 198—204

FOREIGN PATENTS
549,707 4/1932 Germany.

SAMUEL F. COLEMAN, *Primary Examiner.*
WILLIAM B. LA BORDE, *Examiner.*